Sept. 29, 1970     E. M. COMELLAS     3,531,165
PIVOTAL CONNECTION FOR ELEMENTS UNDER TENSION
Filed Oct. 21, 1968

INVENTOR
Edouard Martin COMELLAS
BY Pierre Lesperance

AGENT

United States Patent Office 3,531,165
Patented Sept. 29, 1970

3,531,165
PIVOTAL CONNECTION FOR ELEMENTS UNDER TENSION
Edouard Martin Comellas, 40 De la Fonderie St., Cap de la Madelene, Quebec, Canada
Filed Oct. 21, 1968, Ser. No. 769,224
Int. Cl. B62d 55/20
U.S. Cl. 305—59   13 Claims

ABSTRACT OF THE DISCLOSURE

A pivotal connection adapted to interconnect elements under tension such as staggered lugs forming an endless track for tractors, comprising three rods extending through cylindrical holes in the element, said holes having a greater diameter than the diameter of the circle circumscribing the rods, so as to form a low friction pivotal connection.

---

The present invention relates to a pivotal connection for elements under tension.

The pivotal connection of the present invention is applicable to the hinged metal wear plates forming the endless tracks of a tracked vehicle, or to the pivoted elements of any type of chains adapted to be under tension.

The invention is also applicable to the traction and driving units of an endless track for tracked vehicles of the general type described and shown in my Canadian Pat. No. 658,255.

The main object of the present invention resides in the provision of a pivotal connection for elements under tension, in which friction is practically eliminated, the degree of friction being comparable to needle or ball bearings without attendant complexity of construction and need for precision manufacture.

A more specific object of the present invention is to provide a pivotal connection comprising three rods extending through cylindrical holes of the elements connected by the rods, the arrangement being such that there is provided substantially pure rolling movement between the rods and hole surfaces.

Another object of the invention resides in the provision of an endless track having pivotal connections comprising rods of the character described, said endless track having more flexibility and greater bending characteristics than conventional belt-type endless tracks.

Another object of the invention is to provide pivotal rods of the character described, which can be of any length and still provide substantially pure rolling movement between the same and the hole surfaces of the elements connected thereby.

Another object of the invention resides in the provision of a pivotal connection comprising three rods as mentioned above, in which one rod carries collars at the ends to hold the rod assembly in position within the holes of the elements.

Another object of the present invention resides in the provision of a pivotal connection of the character described, in which the collars serve also to seal the endmost holes of the assembly of pivoted elements to thereby hold any lubricant contained in the holes.

The foregoing and other objects of the present invention will become more apparent during the following disclosure and by referring to the drawings, in which.

In the drawings, like reference characters indicate like elements throughout.

Figure 1:
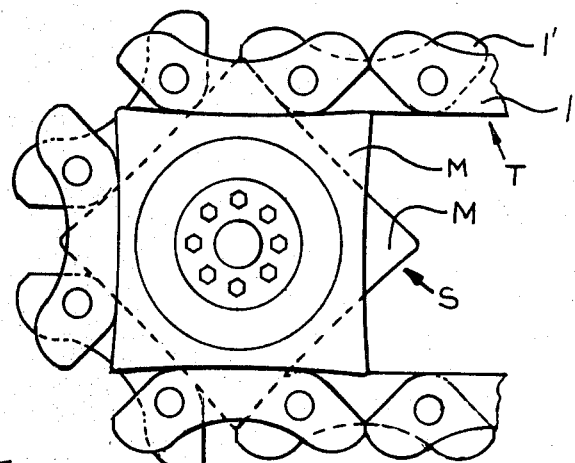
FIG. 1 is a partial side elevation of an endless track provided with the pivotal connections of the present invention and trained on a driving sprocket.
Figure 2:
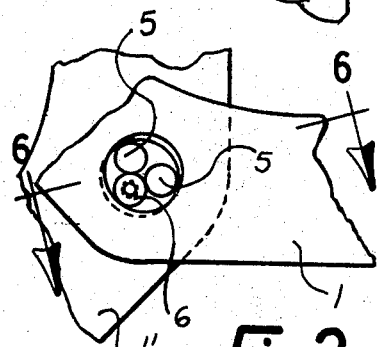
FIG. 2 is a partial side elevation, on an enlarged scale, of two elements of the endless track of FIG. 1 and showing the assembly of pivotal rods in end elevation, the end collar being removed.

The pivotal connection of the invention is illustrated in connection with an endless track for a tracked vehicle, although it can be used in other applications.

In the drawings, the endless track T is trained at one end on a driving sprocket S of the type, for instance, comprising a plurality of laterally arranged square members M disposed at a 45° angle with respect to each other for contact with and for driving ground-engaging traction units or members 1, 1' consisting of elongated bodies, arranged in parallel longitudinal rows, the units of one row being longitudinally displaced with respect to the units of an adjacent row, the units being hinged by the pivotal connections of the invention.

The units or lugs 1, 1' may be made of rubber, plastic or the like and each is provided near the ends thereof with a transverse hole 2, 2' respectively, opening at both side surfaces 3 of the lug, the holes 2, 2' being defined in the present instance by a sleeve 4, made of metal, and inserted through the lug.

Three cylindrical rods 5, 6, preferably of equal diameter, extend through the registering holes 2 transversely to the long axis of the track T. There are two rods 5 which are about the same length as the total width of the track, and one rod 6 serving not only as a pivotal member but also as a carrying means for retaining the assembly of rods within the holes and for sealing the holes.

Figure 3:
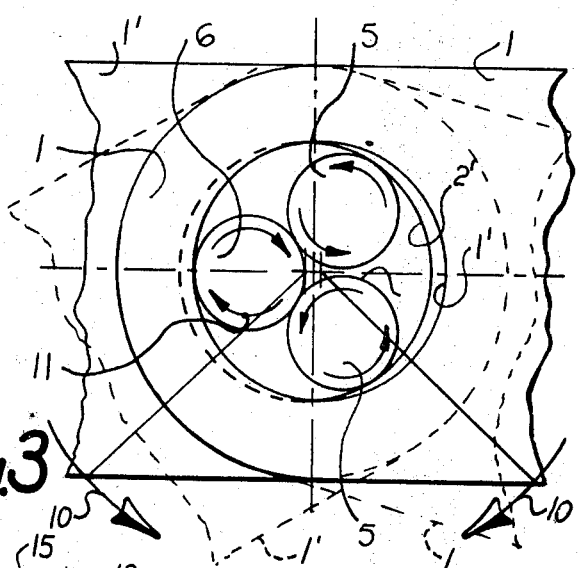
FIG. 3 is a schematic elevation of the pivotal connection, on an enlarged scale.
Figure 6:
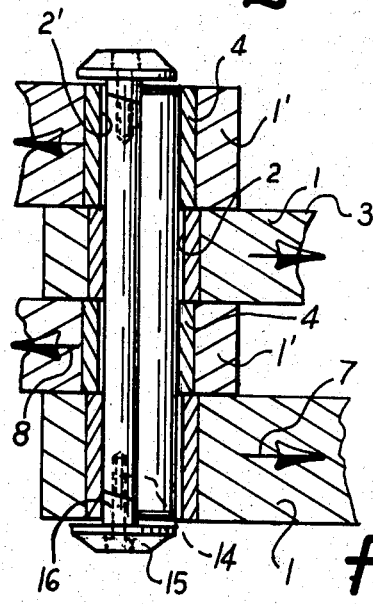
FIG. 6 is a cross-section, taken along line 6—6 of FIG. 2, showing moreover the end collars in position.
Figures 4, 5:
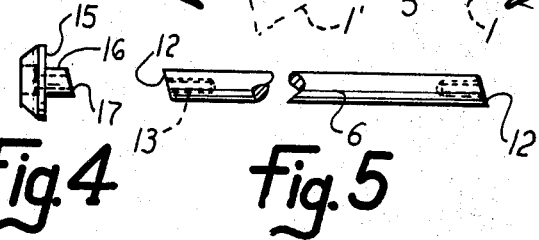
FIG. 4 is a side view of one end collar.
FIG. 5 is a broken-away side view of the pivotal rod adapted to be connected to the end collar.

When the lugs or units 1, 1' are put under tension, alternate lugs 1 and alternate lugs 1' exert opposite forces on the assembly of rods 5 and 6, as shown in FIG. 6, by arrows 7 and 8. The lugs 1, 1' have their holes 2, 2' correspondingly displaced, as shown in FIG. 6 and also in FIG. 3. Thus, as shown in FIG. 3, two of the rods, for instance, the two rods 5, will engage the surface of the holes 2' of alternate lugs 1', while the remaining rod, namely rod 6, will engage the surface of the holes 2 of the remaining lugs 1.

In accordance with the invention, the diameter of each hole 2, 2' must be greater than the diameter of the circle circumscribing the rods 5 and 6 in their radial direction when said rods are placed parallel to one another and each rod contacts the other two. With this condition observed, there has been found that the two rods in contact with the same hole surface, namely rods 5 in FIG. 3 contacting the surface of holes 2', will separate from each other when lugs or units 1, 1' are under tension. In practice, the degree of separation shown at 9 may not be very much. In fact, the two rods 5 may be in near contact; but, as long as there is no pressure thereon, there will be no friction between the two rods which rotate in the same direction upon relative pivoting of lugs 1 and 1'. Thus, when the lugs 1, 1' are rotated, for instance in accordance with arrows 10, about their respective centers, the rods 5 and 6 rotate in accordance with the double arrows 11 and they are in substantially pure rolling contact with one another and with their respective hole surfaces.

It will be noted that the force exerted by rod 6 on each rod 5 is directed along the line connecting the centres of the rods 5 and 6, while the force exerted by surface 2' on rod 5 intersects the centre of rod 5 and point of contact of rod 5 and hole surface 2'. The resultant force on each rod 5 tends to separate the two rods 5 from each other.

It will be noted that with wear of the rods and consequent decrease in diameter, there is more separation between the two rods 5. However, it is obvious that the diameter of the holes 2, 2' must not be greater than the diameter of the circle which would circumscribe the cylindrical rods 5 and 6 in their radial direction when they are placed side by side against each other with their longitudinal axes in a common plane.

Rod 6 has preferably bevelled ends 12, each provided with an axial threaded blind bore 13, to receive a bolt 14 which retains a collar 15 having a stem 16 with a bevelled end 17 engaging the bevelled end 12 of the rod, whereby the collars are prevented from rotating with respect to the rod 6 and, therefore, prevent unscrewing of the bolts 14.

The head of each bolt 14 is recessed within the respective collars and the latter have a frusto-conical shape so as to prevent damage to the bolt and collar by rocks and the like when the system is used in endless tracks.

The collars 15 engage the lateral surfaces of the external units 1, 1' and abut against the two rods 5. Thus, they serve to prevent disengagement of the assembly of rods from within the holes. These collars 16 also serve to seal the holes 2, 2', thereby to retain in the holes and around the rods a suitable lubricant, if such is necessary.

Although the pivotal connection has been illustrated as in association with a plurality of staggered lugs forming an endless track, it is obvious that the same pivotal connection may be used in association with other types of endless track elements, with all types of chains, and also as a connection, for instance, of conveyor belt sections and, generally speaking, the rods may be used as a hinge assembly for pivoted members set under tension. Obviously, to have a stable system, the rods must extend through at least three registering holes, the surface of which exerts a traction to the traction exerted by the surfaces of the other two holes.

What I claim is:

1. A pivotal connection compriisng two members disposed adjacent each other, a portion of one of said two members extending along a portion of the other of said two members, each of said two portions having a cylindrical hole of the same diameter extending therethrough and registering with the hole of the other portion, three cylindrical rods extending through said holes, and the diameter of each of said holes being greater than the diameter of the circle which would circumscribe said three rods in their radial direction when said rods are placed side by side parallel to one another and each rod contacts the other two.

2. A pivotal connection as claimed in claim 1, wherein said rods are substantially of equal diameter.

3. A pivotal connection as claimed in claim 1, wherein the diameter of at least one of said cylindrical holes is less than the diameter of the circle which would circumscribe said cylindrical rods when said rods are placed side by side against each other with their longitudinal axes in a common plane.

4. A pivotal connection as claimed in claim 1, wherein said members are of elongated shape and disposed in a plurality of rows to form an endless track for a track vehicle, the members in each row being displaced longitudinally relative to the members in an adjacent row, said holes being made in both ends of said elongated members.

5. A pivotal connection as claimed in claim 1, wherein one of said rods carries collar members at its ends, said collar members overlying the ends of the remaining rods and at least part of the external surfaces of said portions around the holes thereof such as to retain all of said rods in said holes.

6. A pivotal connection as claimed in claim 5, wherein said rod carrying said collars, has bevelled ends with a threaded axial bore at each end, said collars having a stem with a bevelled end for engaging the bevelled ends of said last-named rod, said collars having a through bore for receiving a bolt threaded in the ends of said one rod to retain said collars against rotation with respect to said one rod.

7. An endless track for a tracked vehcile, comprising a plurality of elongated bodies disposed in parallel rows, the bodies of at least one row being staggered relative to the body of another row, each of said bodies having a pair of transverse cylindrical holes of the same diameter extending therethrough near both ends thereof, all of said holes being aligned transversely of the rows into a plurality of assemblies of registered holes extending transversely of the track at spaced-apart points along the latter, a group of three cylindrical rods extending through each assembly of holes and forming a pivotal connection with each assembly for the associated elongated bodies, and the diameter of each said cylindrical holes being greater than the diameter of the circle which would circumscribe the corresponding group of three rods in their radial direction when the rods are placed side by side parallel to one another and each rod contacts the other two.

8. An endless track as claimed in claim 7, wherein said rods are of equal diameter.

9. An endless track as claimed in claim 8, wherein the diameter of at least one of said holes of one assembly of holes is less than the diameter of the circle which would circumscribe the associated cylindrical rods in their radial direction when said three associated rods are placed side by side against each other with their axes in a common plane.

10. An endless track as claimed in claim 7, wherein one of said rods in each pivotal connection carries collar members at its ends overlying the ends of the other rods of the same pivotal connection and at least part of the external surface of the bodies in the external rows of said track to retain the assembly of rods within said holes.

11. An endless track as claimed in claim 10, wherein said collars completely close the holes of the bodies of the external rows of bodies, whereby to prevent discharge of lubricant.

12. And endless track as claimed in claim 10, wherein at least one of said collars is detachably connected to the end of the rod carrying said collars.

13. An endless track as claimed in claim 12, wherein the ends of the rod carrying said collars are bevelled and said one rod has a threaded axial blind more opening at both ends, said collars having a stem with a bevelled end for engaging the bevelled ends of said one rod, said collars and stem having a through bore for receiving a bolt screwed in the blind bore of said rod, whereby the bevelled ends of said stem and one rod prevent relative rotation between the same.

References Cited

UNITED STATES PATENTS

| 501,587 | 7/1893 | Gleason | 305—59 X |
|---|---|---|---|
| 627,694 | 6/1899 | Howe | 74—251 |
| 1,656,610 | 1/1928 | Smyth | 305—58 |
| 2,181,136 | 11/1939 | Knox. | |

FOREIGN PATENTS

| 607,694 | 11/1960 | Canada. |
|---|---|---|
| 1,252,802 | 12/1960 | France. |

RICHARD J. JOHNSON, Primary Examiner

U.S. Cl. X.R.

74—253; 287—92; 305—14